April 9, 1963 W. T. DENNISON 3,084,849
INLET AND BEARING SUPPORT FOR AXIAL FLOW COMPRESSORS
Filed May 18, 1960 2 Sheets-Sheet 1

INVENTOR
WILLIAM T. DENNISON
BY Feller and McCormick
ATTORNEYS

April 9, 1963  W. T. DENNISON  3,084,849
INLET AND BEARING SUPPORT FOR AXIAL FLOW COMPRESSORS
Filed May 18, 1960  2 Sheets-Sheet 2

3,084,849
INLET AND BEARING SUPPORT FOR AXIAL
FLOW COMPRESSORS
William T. Dennison, West Hartford, Conn., assignor to
United Aircraft Corporation, East Hartford, Conn., a
corporation of Delaware
Filed May 18, 1960, Ser. No. 29,981
7 Claims. (Cl. 230—122)

This invention relates to axial flow compressors, and deals more particularly with an improved and integrated construction for the air inlet and the support for the front bearing of such a machine.

The primary object of this invention is to provide an improved construction for supporting the front bearing of an axial flow compressor relative to the compressor casing or mounting structure and from the inner ends of the inlet guide vanes, said construction being compact in size, of simple arrangement, requiring relatively few parts and permitting easy access to the front of the compressor.

Another object of this invention is to provide an improved support and lubricating means for the front bearing of the compressor.

A further object of this invention is to provide a supporting structure for the front bearing of a compressor rotor whereby the bearing is so located relative to the lubricant sump or scavenging chamber that the lubricant flows directly from the bearing to the sump with the result that none of the supporting members need to be drilled or otherwise provided with openings or passageways for the return of the lubricant to the sump.

A still further object of this invention is to provide a means for supporting the compressor front bearing from the inner ends of the inlet guide vanes in such a manner that the bearing is cantilevered from a single radial supporting member with the result that a measurable amount of flexibility is present at the bearing, such flexibility serving to lower the natural frequency of vibration of the compressor rotor so that the rotor can be safely operated at normal speeds which are above the speed corresponding to the said natural frequency.

Further objects and advantages of the invention will be apparent from the drawings and from the following description.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figures 1, 3:
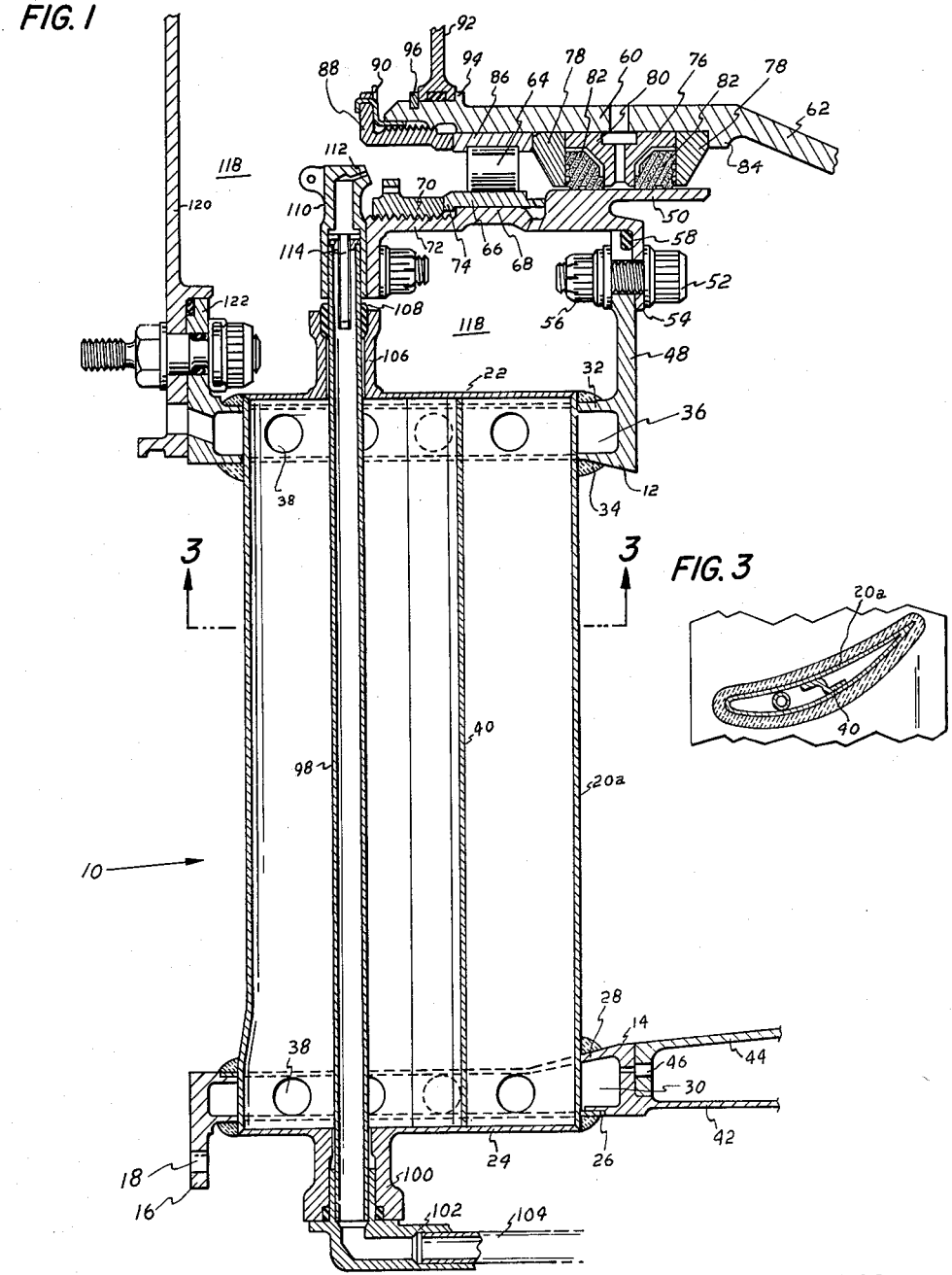
Figure 2:
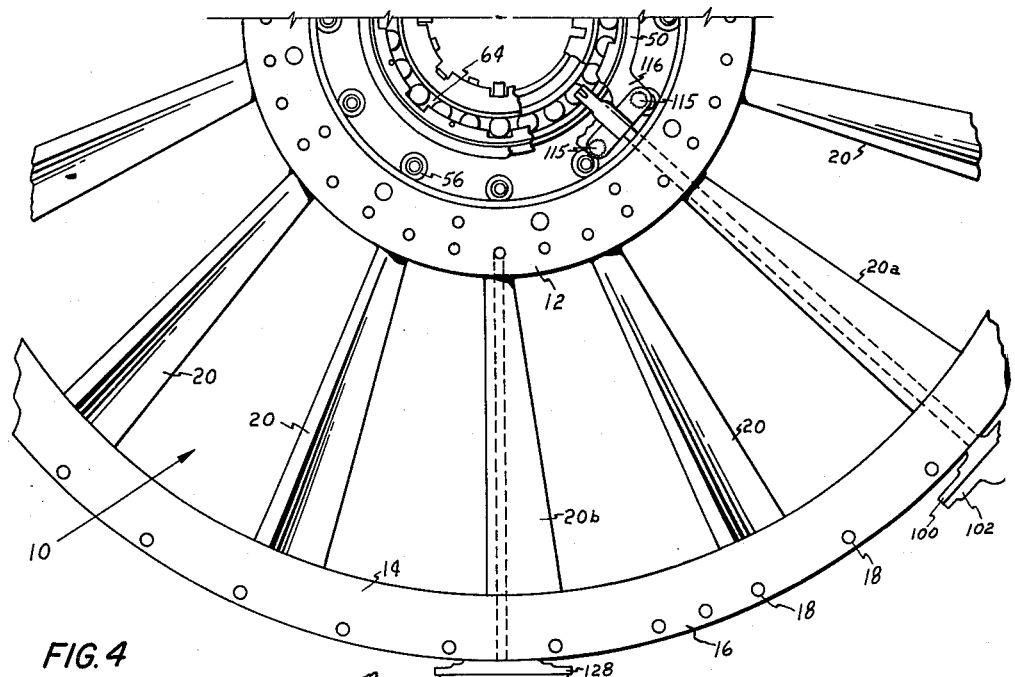
Figure 4:
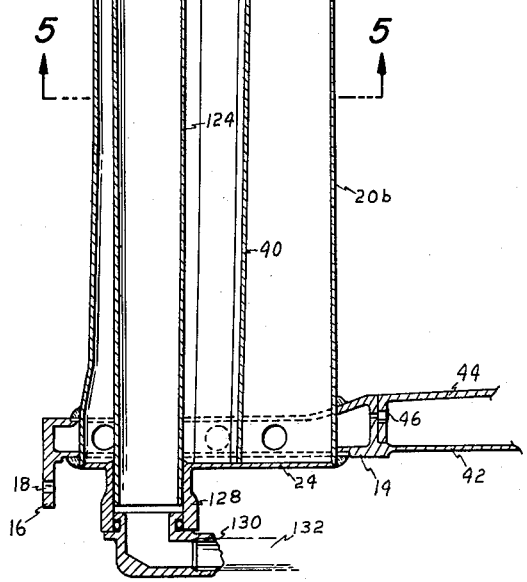
Figure 5:
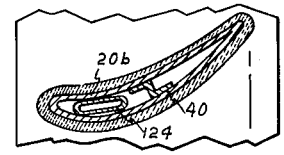

Of the drawings:

FIG. 1 is a fragmentary sectional view taken in a plane passing generally through the longitudinal axis of an axial flow compressor and showing an inlet vane and front bearing support construction embodying this invention, the view being taken through the inlet guide vane containing the lubricant supply conduit and parts behind the plane of the view being omitted for clarity, FIG. 2 is a reduced scale partial front view of the inlet vane and bearing support construction shown in FIG. 1 with the front cover being omitted to show more clearly the structure of the bearing support, FIG. 3 is a fragmentary sectional view taken on the line 3—3 of FIG. 1 and drawn on a reduced scale from that of FIG. 1, FIG. 4 is a fragmentary sectional view taken through the inlet guide vane containing the lubricant scavenging conduit with parts behind the plane of the view being omitted for clarity, and, FIG. 5 is a fragmentary sectional view taken on the line 5—5 of FIG. 4.

In the drawings wherein for the purpose of illustration is shown a preferred embodiment of this invention, and first referring to FIGS. 1 and 2, the reference numeral 10 indicates generally the air inlet for an axial flow compressor. The inlet 10 is annular in shape and defined by concentric, radially spaced inner and outer annular shrouds 12 and 14 respectively. The outer shroud 14 is adapted to be supported from suitable engine mounting structure, not shown, by means of a radially outwardly extending flange 16 which is formed on its upstream end and is provided with a plurality of circumferentially spaced openings 18, 18 which serve to receive mounting bolts or other fasteners.

The inner annular shroud 12 is supported from the outer shroud 14 by means of a plurality of inlet guide vanes 20, 20 which, as shown in FIG. 2, extend radially between the two shrouds and are arranged in a circumferentially spaced annular series within the air inlet 10. The inlet guide vanes 20, 20 have a curved, generally airfoil-shaped cross section and serve to direct the inlet air into proper operative relationship with the first stage blades of the compressor rotor. The first stage blades of the compressor rotor are not shown in FIG. 1, but it is to be understood that they are located directly to the right of the guide vane shown therein. The guide vane shown in FIG. 1 contains the lubricant supply conduit, as described below in more detail, but in other aspects is similar to most of the other guide vanes 20, 20. To distinguish the guide vane of FIG. 1, however, from those which do not contain a lubricant supply conduit or other supplemental elements, it has been designated by the reference character 20a. Likewise, the guide vane shown in FIG. 4 which contains the lubricant scavenging conduit is designated by the reference character 20b to distinguish it from the other guide vanes 20, 20. Again, both of the guide vanes 20a and 20b are generally similar to the other guide vanes 20, 20 except for the addition of the lubricant supply and scavenging conduits thereto. Each of the guide vanes is of a hollow construction, as shown best in FIGS. 3 and 5, and is closed at its inner end by an inner cover 22 and at its outer end by an outer cover 24. The opposite end portions of the vanes fit into corresponding openings in the inner and outer shrouds 12 and 14 and are welded to the shrouds as indicated in FIG. 1.

From FIG. 1 it will also be noted that the outer shroud 14 comprises an outer annular ring 26 and an inner annular ring 28 which collectively define a closed annular chamber 30 adjacent the outer end portions of the vanes 20, 20. Similarly, the inner annular shroud 12 consists of an inner annular ring 32 and an outer annular ring 34 which collectively define an annular chamber 36 adjacent the inner end portions of the vanes 20, 20. The chambers 30 and 36 serve as part of a system for circulating anti-icing air through the vanes 20, 20 and each vane is provided with openings 38, 38 which communicate with the chambers 30 and 36 to provide for the flow of air radially through the vanes. The anti-icing system, however, forms no part of this invention, the structure thereof in relation to the vanes 20, 20 being made by way of example only, and other mounting means for the inner and outer ends of the vanes may be employed, with or without anti-icing provision, without departing from the scope of this invention. The vanes 20, 20 need not necessarily be hollow, but when they are made in hollow form it is generally desirable that they each include a stiffener 40 in the inside of the vane which extends radially along the length of the vane in engagement with both of the opposite interior walls of the vane, as shown in FIGS. 3 and 5.

The compressor casing is indicated generally at 42 in FIG. 1 and is preferably integral with the outer annular shroud 14, as shown. The casing 42 also preferably extends downstream for a distance equal to about one-half the length of the compressor rotor and is at its downstream end connected with another casing portion which extends downstream for the remainder of the length of the compressor so that no separate or additional compressor casing is required. The member partially shown at 44 in FIG. 1 is the outer annular seal for the first stage compressor blades and is connected with the outer annular shroud 14 by a plurality of stepped pins, one of which is shown at 46.

Referring again to FIG. 1, it will be noted that the inner annular shroud 12 has a flange 48 integrally connected with its downstream edge portion and extending radially inwardly therefrom. The flange 48 serves to support a cylindrical bracket or sleeve 50 which is connected to the supporting flange 48 by means of a plurality of bolts 52, 52 which pass through an outwardly extending annular flange 54 on the bracket 50 and through the inner margin of the supporting flange 48. The bolts 52, 52 have nuts 56, 56 threadably received on their upstream ends and a sealing ring 58 is employed between the flange 54 and the flange 48, as shown in FIG. 1.

The bracket 50, as shown in FIG. 1, extends axially upstream from the supporting flange 48 and beyond the downstream edges of the guide vanes 20, 20 and serves to receive the front journal portion 60 of the compressor rotor. The compressor rotor is not shown in detail in FIG. 1, but it will be understood that the journal portion 60 is located at the front of the rotor and is integral with the end bell which is partially illustrated and indicated at 62. The journal portion 60 is rotatably supported with respect to the bracket 50 by means of a roller bearing unit 64 which is positioned between the inner bore of the bracket 50 and the outer surface of the journal portion 60. The location of the bearing unit is such that it falls between the upstream and downstream edges of the guide vanes, that is, the bearing unit is disposed in a radial plane, a plane normal to the axis of rotation, passing through the bodies of the guide vanes. The outer race 66 of the roller bearing unit 64 is received by a corresponding bore portion 68 of the bracket 50 and is held in place with respect to the bracket by means of the retaining nut 70 which is threadably connected with a portion 72 of the bracket 50 that extends upstream from the bearing 64, the outer race 66 including a flange 74 which is held in engagement with a shoulder in the bore of the bracket 50 by the retaining nut 70.

Downstream of the bearing 64 is a seal unit 76 which closes the space between the journal portion 60 and the bracket 50 to prevent the escape of lubricant therebetween. The seal 76 comprises two annular plate seals 78, 78, which are held in axially spaced relation by a spacer 80, and two annular graphite seals 82, 82 each of which engages the bore of the bracket 50 and a radial face on a corresponding one of the plate seals 78, 78. The right-hand plate seal 78 engages a rib 84 formed on the journal portion 60, while the other plate seal engages the downstream end of the outer race 86 of the bearing 64. The outer race 86, the two plate seals 78, 78 and the spacer 80 are in turn held in place on the journal portion 60 by means of a retainer nut 88 which is threadably received by the upstream end portion of the journal portion 60. Loosening movement of the retaining nut 88 is prevented by means of a tablock 90. The journal portion 60 is hollow and the upstream end portion thereof is closed by a circular plug 92 which is held in place by means of a shoulder 94 and a snap ring 96.

From the foregoing, and by reference to FIG. 1, it will be noted that the supporting flange 48 serves as the sole radial support for the bracket 50 and the bearing 64, and it will also be noted that the bearing 64 is located upstream from the flange 48 so as to be supported in a cantilevered fashion therefrom. In this regard it should be noted that the oil supply conduit, later to be described, forms no substantial part of the structural support for the bracket. The cantilevered supporting arrangement for the bearing 64 provides for a certain amount of flexibility at the bearing and thus provides the compressor rotor with a lower natural frequency of vibration than would be the case if the bearing were more sturdily supported, has has generally been the case with previous constructions. The speed of the rotor which corresponds to the lower natural frequency of vibration produced by this mounting arrangement has been found to be sufficiently below the normal operating speed of the rotor so that the rotor in normal operation will operate safely and well above its natural frequency. Also, since the bearing 64 is located axially in line with the guide vanes, the radial loads imposed on the bearing act along lines passing radially through the guide vanes so that torque loads on the shrouds, vanes and other parts of the engine are minimized.

In addition to the advantages achieved by the bearing supporting structure in regard to the lower natural frequency, the presently illustrated structure has further advantages in regard to the provision of means for lubricating the bearing 64. Since the bearing 64 is subjected to relatively severe service conditions, it is desirable that it be lubricated by a pressurized spray system. Referring to FIG. 1, this system includes an oil supply conduit 98 which extends through the guide vane 20a. At its outer end the conduit 98 extends beyond the outer cover 24 of the vane 20a and has associated therewith a suitable connector 100 for receiving a complementary connector 102 which connects the conduit 98 to another conduit 104 leading to a source of lubricant under pressure. The inner end of the conduit 98 extends inwardly beyond the inner cover 22 of the van 20a and is supported by a surrounding sleeve 106 attached to the cover 22, the sleeve 106 containing a seal 108 that engages the outer surface of the conduit 98. The conduit 98 extends inwardly beyond the inner end of the sleeve 106 and has on its extreme end portion a nozzle 110 having an orifice 112. The orifice 112 is directed in a generally downstream direction so as to spray lubricant from the conduit 98 into the annular space between the bracket 50 and the journal portion 60 onto the bearing 64. Between the inner end of the conduit 98 and the nozzle orifice 112 is a lubricant screen or filter 114. The nozzle 110 is, as shown in FIG. 2, secured by means of threaded fasteners 115, 115 to a tab 116 formed on the upstream end of the bracket 50 and extending radially outwardly therefrom.

Surrounding the bracket 50 is an annular sump or lubricant scavenging chamber 118. The inner surface of the inner annular shroud 12, including the inner vane covers 22, 22, defines the outer periphery of the scavenging chamber 118 while the supporting flange 48 defines the right-hand wall of the chamber. The left-hand wall of the chamber is defined by a circular front cover 120 which is fastened to a radially inwardly extending flange 122 on the upstream edge portion of the inner annular shroud 12. The bracket 50 projects freely into the center of the chamber 118 with the result that the upstream side of the bearing 64 is in direct communication along its full circumference with the chamber 118 and with the inner surface of the inner annular shroud 12 which serves as the periphery of the chamber. Thus, spent oil or lubricating media may flow directly from the bearing 64 to the outer and lower portions of the chamber 118 without having to pass through any structural member or members. This means that none of the structural supporting members for the bearing needs to be drilled or otherwise provided with passageways to enable the flow of the lubricant to the scavenging chamber. This, of course, has great importance in reducing unknown stress concentration factors in the compressor structure.

Lubricant which drains into the bottom of the sump or scavenging chamber 118 is removed therefrom by means of a scavenging conduct 124 which extends radially through the vane 20b, the vane 20b being the one located at the lowermost or six o'clock position in the air inlet, as shown in FIG. 2. As shown in FIGS. 4 and 5, the scavenging conduit 124 has a flattened cross section and at its inner end has a mouth 126 located adjacent the inner surface of the shroud 12, the vane cover 22 being considered as part of the inner surface of the shroud 12, so that lubricant which settles in the bottom of the chamber 118 will be withdrawn therefrom through the mouth 126. At its lower end the scavenging conduit 124 extends through the outer cover 24 and has associated therewith a coupling member 128 which receives a complementary coupling member 130 for connecting the scavenging conduit to another conduit 132 which returns the lubricant to the lubricant reservoir.

In addition to providing for the proper lubrication of the bearing 64 it will also be noted that the lubrication system described above is so integrated with the bearing support structure that both the support structure and the lubricating system form a compact arrangement of parts which take up little space and require few components.

The invention claimed is:

1. The combination in an axial flow compressor of, radially spaced inner and outer annular shrouds arranged concentrically to define an annular air inlet for said compressor, a plurality of radially extending guide vanes arranged in a circumferentially spaced annular series between said inner and outer shrouds and having their inner ends fixedly secured to said inner shroud and their outer ends fixedly secured to said outer shroud, an annular supporting flange connected with one edge portion only of said inner shroud and extending radially inwardly therefrom, a cylindrical support bracket connected with the radially inner portion of said support flange and extending axially therefrom toward the other edge portion of said inner shroud, a rotor having a forward journal portion positioned within said bracket, and an anti-friction bearing between said bracket and said rotor journal portion for rotatably supporting said journal portion with respect to said bracket, the said bearing being spaced axially from said support flange and located in a radial plane passing through said guide vanes so that said bearing is flexibly supported in cantilevered fashion from said support flange by said cylindrical bracket.

2. The combination in an axial flow compressor of, radially spaced inner and outer annular shrouds arranged concentrically to define an annular air inlet for said compressor, a plurality of radially extending guide vanes arranged in a circumferentially spaced annular series between said inner and outer shrouds and having their inner ends fixedly secured to said inner shroud and their outer ends fixedly secured to said outer shroud, an annular supporting flange connected with said inner shroud solely along the downstream edge portion of the latter and extending radially inwardly therefrom, a cylindrical support bracket connected with the inner margin of said support flange and extending some distance axially upstream therefrom and beyond the downstream edges of said guide vanes, a rotor having a forward journal portion positioned within said cylindrical bracket, and an anti-friction bearing between said bracket and said rotor journal portion for rotatably supporting said journal portion with respect to said bracket, the said bearing being located some distance upstream from said support flange in a radial plane passing through said guide vanes so that said bearing is flexibly supported in cantilevered fashion from said support flange by said cylindrical bracket.

3. The combination in an axial flow compressor of, radially spaced inner and outer annular shrouds arranged concentrically to define an annular air inlet for said compressor, a plurality of radially extending guide vanes arranged in a circumferentially spaced annular series between said inner and outer shrouds and having their inner ends fixedly secured to said inner shroud and their outer ends fixedly secured to said outer shroud, an annular supporting flange connected with said inner shroud solely along the downstream edge portion of the latter and extending radially inwardly therefrom, a cylindrical support bracket connected with the inner margin of said support flange and extending some distance axially upstream therefrom in axially overlapped relation with said inner shroud so that an open annular chamber is defined between said bracket and said inner shroud, a rotor having a forward journal portion positioned within said bracket, a bearing between said bracket and said rotor journal portion for rotatably supporting said journal portion with respect to said bracket, a lubricant supply conduit means extending radially through one of said guide vanes and inwardly beyond said inner shroud and having a nozzle on its inner end arranged to spray lubricant from said conduit means onto said bearing, and a lubricant scavenging conduit extending radially through another of said guide vanes and having an opening adjacent the inner surface of said inner shroud for receiving lubricant which collects in said chamber adjacent said latter surface.

4. The combination in an axial flow compressor of, radially spaced inner and outer annular shrouds arranged concentrically to define an annular air inlet for said compressor, a plurality of radially extending guide vanes arranged in a circumferentially spaced annular series between said inner and outer shrouds and having their inner ends fixedly secured to said inner shroud and their outer ends fixedly secured to said outer shroud, an annular supporting flange connected with said inner shroud solely along the downstream edge portion of the latter and extending radially inwardly therefrom, a cylindrical support bracket connected with the inner margin of said support flange and extending some distance axially upstream therefrom in axially overlapped relation with said inner shroud so that an open annular chamber is defined between said bracket and said inner shroud, a rotor having a forward journal portion positioned within said bracket, a bearing between said bracket and said rotor journal portion for rotatably supporting said journal portion with respect to said bracket, the said bearing being spaced axially upstream from said support flange so as to be supported in cantilevered fashion therefrom and said annular bracket being of such length as to extend axially upstream beyond said bearing, a lubricant nozzle connected with the upstream end portion of said bracket and arranged to spray lubricant in a generally downstream direction onto said bearing, and a lubricant supply conduit means for delivering lubricant under pressure to said nozzle and which conduit means extends through one of said guide vanes and inwardly beyond said inner shroud for connection with said nozzle.

5. The combination in an axial flow compressor of, means defining an annular inlet for said compressor and which means includes an inner annular shroud, a supporting member connected with said inner annular shroud solely along the downstream edge portion of the latter and extending radially inwardly therefrom, a cylindrical bracket connected with said supporting member and extending axially upstream therefrom in radially spaced and axially overlapped relation to said inner shroud, a compressor rotor having a journal portion positioned within said bracket, and a bearing between said bracket and said journal portion for rotatably supporting said journal portion with respect to said bracket, the said inner annular shroud and the said support member defining respectively the outer peripheral wall and the downstream radial wall of an annular lubricant scavenging chamber into which chamber said annular bracket projects from said support member with the result that the upstream side of said bearing is in direct communication with the outer periphery of said lubricant scavenging chamber along the full circumference thereof so that lubricant from the said bearing may flow directly to said scavenging chamber without having to pass through any structural member or members.

6. The combination as defined in claim 5 further characterized by a lubricant scavenging conduit which extends through one of said guide vanes and has an opening adjacent the inner surface of said inner shroud for draining lubricant from said chamber.

7. The combination in an axial flow compressor of, radially spaced inner and outer annular shrouds arranged concentrically to define an annular air inlet for said compressor, a plurality of radially extending guide vanes arranged in a circumferentially spaced annular series between said inner and outer shrouds and having their inner ends fixedly secured to said inner shroud and their outer ends fixedly secured to said outer shroud, an annular supporting flange connected with the downstream edge portion of said inner shroud and extending radially inwardly therefrom, a cylindrical support bracket connected with the inner margin of said support flange and extending some distance axially upstream therefrom in radially spaced and axially overlapped relationship with said inner shroud, a rotor having a forward journal portion positioned within said bracket, a bearing between said bracket and said rotor journal portion for rotatably supporting said journal portion with respect to said bracket, said annular support bracket and said forward journal portion having their upstream ends spaced some distance downstream from the upstream edge portion of said inner shroud, means for supplying lubricant to said bearing, a cover connected with the upstream edge portion of said inner shroud which cover closes the upstream end of said annular shroud and defines one wall of a chamber for collecting lubricant leaving said bearing, the other walls of said chamber being defined by the inner surface of said inner shroud, said annular supporting flange, and said annular support bracket.

References Cited in the file of this patent
UNITED STATES PATENTS

| | | |
|---|---|---|
| 2,732,695 | Davis | Jan. 31, 1956 |
| 2,800,273 | Wheatley et al. | July 23, 1957 |
| 2,884,186 | Clark | Apr. 28, 1959 |
| 2,928,648 | Haines et al. | Mar. 15, 1960 |
| 2,932,443 | Gunberg | Apr. 12, 1960 |
| 2,951,631 | Gregory | Sept. 6, 1960 |